United States Patent
Wang et al.

(10) Patent No.: US 10,875,177 B2
(45) Date of Patent: Dec. 29, 2020

(54) PARTITIONING METHOD FOR A WORK SPACE OF A ROBOT

(71) Applicant: QUANTA STORAGE INC., Taoyuan (TW)

(72) Inventors: Pei-Jui Wang, Taoyuan (TW); Chi-Mo Hsieh, Taoyuan (TW); Yun-Hsuan Tsai, Taoyuan (TW); Shao-Ji Shia, Taoyuan (TW); Shih-Jung Huang, Taoyuan (TW)

(73) Assignee: TECHMAN ROBOT INC., Taoyuan (TW)

( * ) Notice: Subject to any disclaimer, the term of this patent is extended or adjusted under 35 U.S.C. 154(b) by 172 days.

(21) Appl. No.: 16/149,128

(22) Filed: Oct. 2, 2018

(65) Prior Publication Data

US 2020/0101606 A1    Apr. 2, 2020

(51) Int. Cl.
  *B25J 9/16* (2006.01)
  *G05B 19/401* (2006.01)
(52) U.S. Cl.
  CPC .......... *B25J 9/1653* (2013.01); *B25J 9/1692* (2013.01); *B25J 9/1697* (2013.01); *G05B 19/401* (2013.01)
(58) Field of Classification Search
  CPC ...... B25J 9/1697; B25J 9/1653; B25J 9/1692; G05B 19/401
  See application file for complete search history.

(56) References Cited

U.S. PATENT DOCUMENTS

| | | | | |
|---|---|---|---|---|
| 2002/0186299 | A1* | 12/2002 | Cofer | F16P 3/142 348/152 |
| 2004/0125206 | A1* | 7/2004 | Lohmann | B25J 9/1674 348/155 |
| 2010/0191372 | A1* | 7/2010 | Nihei | B25J 9/1676 700/245 |
| 2012/0327190 | A1* | 12/2012 | Massanell | B25J 9/1676 348/46 |
| 2014/0207285 | A1* | 7/2014 | Sakabe | B25J 9/1676 700/259 |
| 2015/0131896 | A1* | 5/2015 | Hu | B25J 9/1676 382/153 |
| 2016/0229068 | A1* | 8/2016 | Haman | F16P 3/00 |
| 2018/0029230 | A1* | 2/2018 | Takahashi | B25J 9/1674 |
| 2018/0243911 | A1* | 8/2018 | Harada | B25J 9/1692 |

* cited by examiner

*Primary Examiner* — Rachid Bendidi
(74) *Attorney, Agent, or Firm* — Winston Hsu

(57) ABSTRACT

The partitioning method for a working space of a robot includes defining the working space of the robot; setting a plurality of partitioning planes based on at least three non-collinear points in the working space; if the setting of the plurality of partitioning planes is completed, defining partitioning lines by intersecting the plurality of partitioning planes; dividing the plurality of partitioning planes into a plurality of designated sections and a plurality of extended sections based on the partitioning lines; combining the plurality of designated sections for constructing a full partitioning plane; partitioning the working space into two working regions based on the full partitioning plane; and setting the working region containing an origin of the robot as an operation region. Therefore, the partitioning process can be simplified.

8 Claims, 6 Drawing Sheets

PARTITIONING METHOD FOR A WORK SPACE OF A ROBOT

BACKGROUND OF THE INVENTION

1. Field of the Invention

The invention relates to a robot, and more particularly, to a robot with human-machine collaboration function and a method for planning working regions allowing different moving speeds of the robot according to an operator's risk levels in the working regions respectively.

2. Description of the Prior Art

A robot is agile in moving, precise in positioning, and robust in operation, which brings an advantage in production and assembly on production lines. When the robot has to collaborate with staff, it is an important issue to ensure safety of the staff during the collaboration.

As disclosed by US patent US20160167231, to ensure safety of the staff working in working regions of the robot, optical sensors or machine vision devices are often utilized to set safety boundaries for planning the working regions. Once an operator is detected to cross the safety boundaries and exposed in an operation region of the robot, a moving speed of the robot can be reduced so as to prevent the robot from hitting and causing harm to the operator. However, the optical sensors or the machine vision devices require not only installation space but also specific auxiliary software, which increases installation cost and lowers competitiveness of the product.

As disclosed by China patent CN105555490A, different colors are utilized to mark the different working regions on the robot platform according to the operator's risk levels in the different working regions. Next, different moving speeds of the robot are assigned according to the exposure levels in the different working regions respectively so as to prevent the robot from causing harm to the operator and also from operating inefficiently. Although the robot platform can be marked with the different colors to indicate the different exposure levels to danger corresponding to the different working regions, it cannot take into account that an actual working space of the robot is a three-dimensional space where boundary planes for the working regions in the working space cannot be substantially marked by colors.

Some conventional methods directly set a coordinate system of the robot across the working space of the robot and mark the boundary planes with coordinates for planning the different working regions of the robot, which helps in assigning different moving speeds to the robot in the different working regions. However, not only marking the boundary planes by coordinate is tedious, but also the boundary planes marked by coordinates are not easy to be visualized for correspondence to the substantial configuration of the working regions. That is, the conventional methods are prone to mistakenly position the robot in or across the human-machine collaboration region so that the robot cannot move at a full speed due to a speed limitation imposed around the human-machine collaboration region, which lowers efficiency of the robot. Therefore, it is important to solve the problem of planning the working regions of the robot.

SUMMARY OF THE INVENTION

To solve the aforementioned problem, it is an objective of the present application to provide a partitioning method for a working space of a robot which sets a plurality of partitioning planes based on at least three non-collinear points in the working space, generates a plurality of designated sections and a plurality of extended sections via intersection of the plurality of partitioning planes, and preserves and combines the plurality of designated sections for constructing a full partitioning plane so that the partitioning process can be simplified.

It is another objective of the present application to provide a partitioning method for the working space of the robot which partitions the working space into two working regions based on the full partitioning plane, wherein the working region containing the robot is set as an operation region and the other working region is set as a ceasing region, so that efficiency of the partitioning process can be improved.

It is another objective of the present application to provide a partitioning method for the working space of the robot which partitions the operation region into two working subregions based on another full partitioning plane, wherein the working subregion containing the robot is set as a full speed subregion and the other working subregion is set as a collaboration subregion, so that efficiency of robot operation can be enhanced.

To achieve the aforementioned objectives, the partitioning method for the working space of the robot includes defining the working space of the robot; setting the plurality of partitioning planes based on the at least three non-collinear points in the working space; checking whether to confirm the setting of the plurality of partitioning planes; continuing to set another set of partitioning planes if the setting of the plurality of partitioning planes is not completed; if the setting of the plurality of partitioning planes is completed, defining the partitioning lines by intersecting the plurality of partitioning planes; dividing the plurality of partitioning planes into the plurality of designated sections and the plurality of extended sections based on the partitioning lines; combining the plurality of designated sections for constructing the full partitioning plane; and partitioning the working space into the two working regions based on the full partitioning plane.

According to an embodiment of the present application, the plurality of designated sections includes the at least three non-collinear points and the plurality of extended sections does not include the at least three non-collinear points. The partitioning method of the present application further includes partitioning the working space into the ceasing region and the operation region based on the full partitioning plane; constructing another full partitioning plane in the operation region; partitioning the operation region into the full speed subregion and the collaboration subregion; and setting the working subregion containing an origin of the robot as the full speed subregion.

According to the embodiment of the present application, the partitioning method of the present application further includes forbidding the robot from entering into the ceasing region; ceasing the robot urgently when the robot is detected to enter into the ceasing region; reducing a moving speed of the robot to a level that causes no harm when the robot is detected to enter into the collaboration subregion; and operating the robot at a full speed without interfering with a staff within the full speed subregion.

In conclusion, the partitioning method of the present application simplifies the partitioning process, improves efficiency of the partitioning process, and enhances efficiency of the robot operation.

These and other objectives of the present invention will no doubt become obvious to those of ordinary skill in the art

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
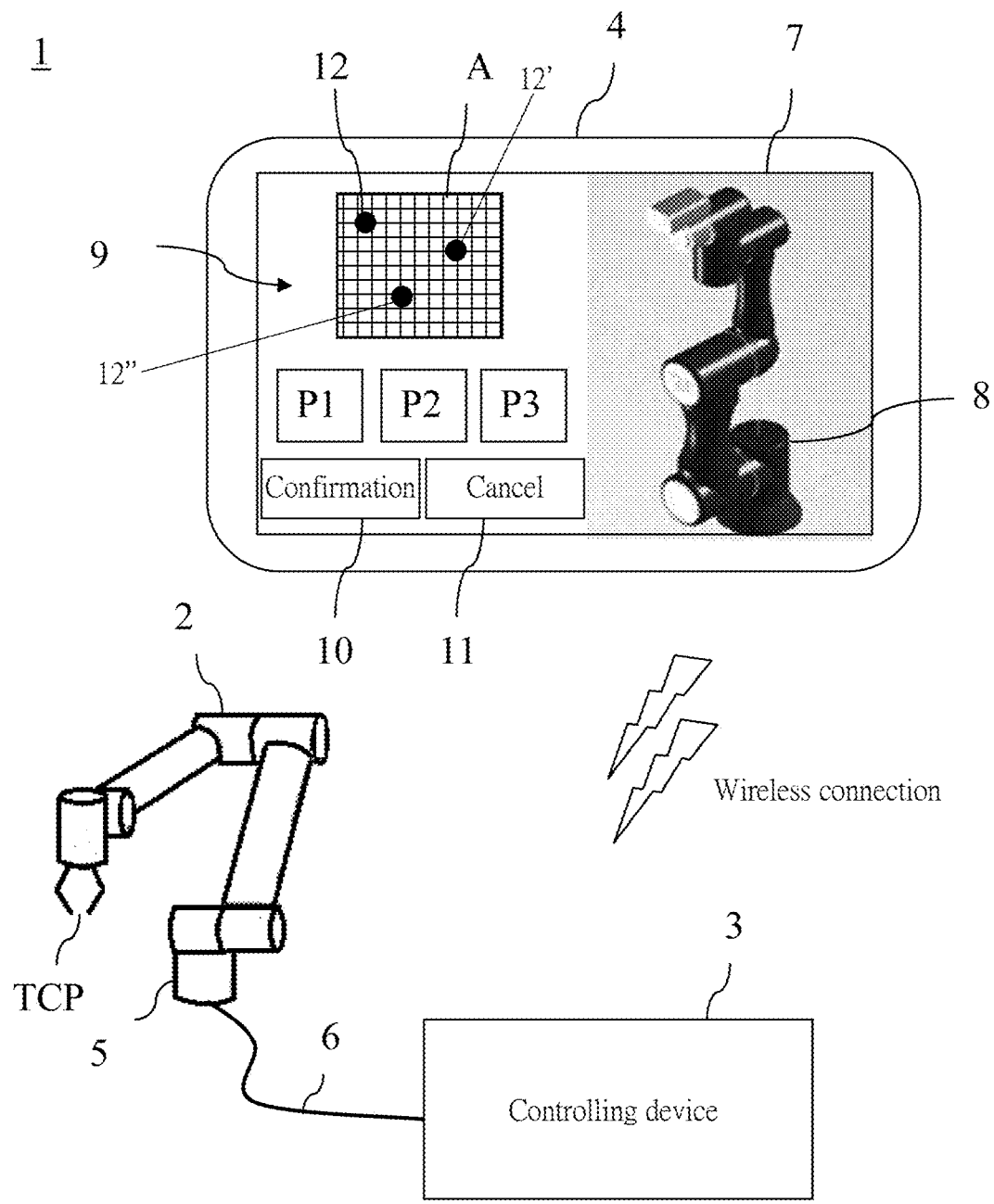
FIG. 1 is a diagram of a control system for controlling a robot according to an embodiment of the present application.
Figure 2:
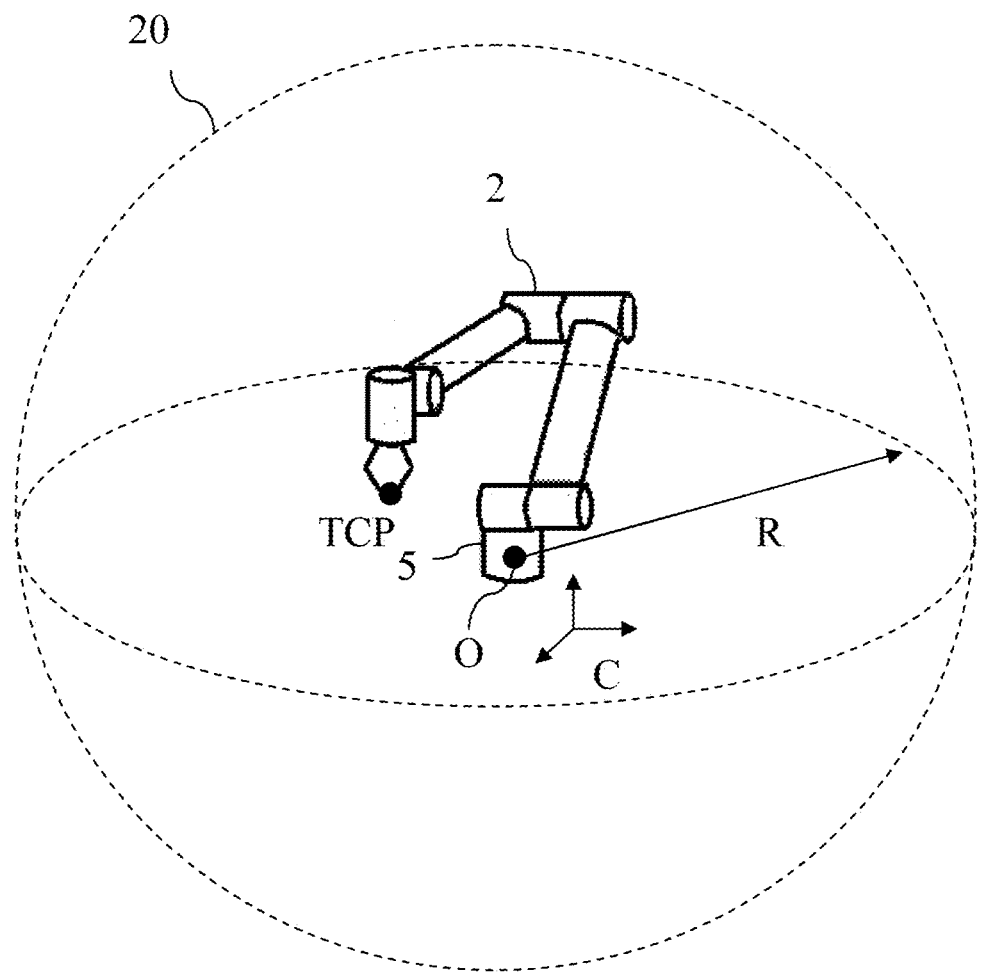
FIG. 2 is a diagram of a working space of the robot according to the embodiment of the present application.
Figure 3:
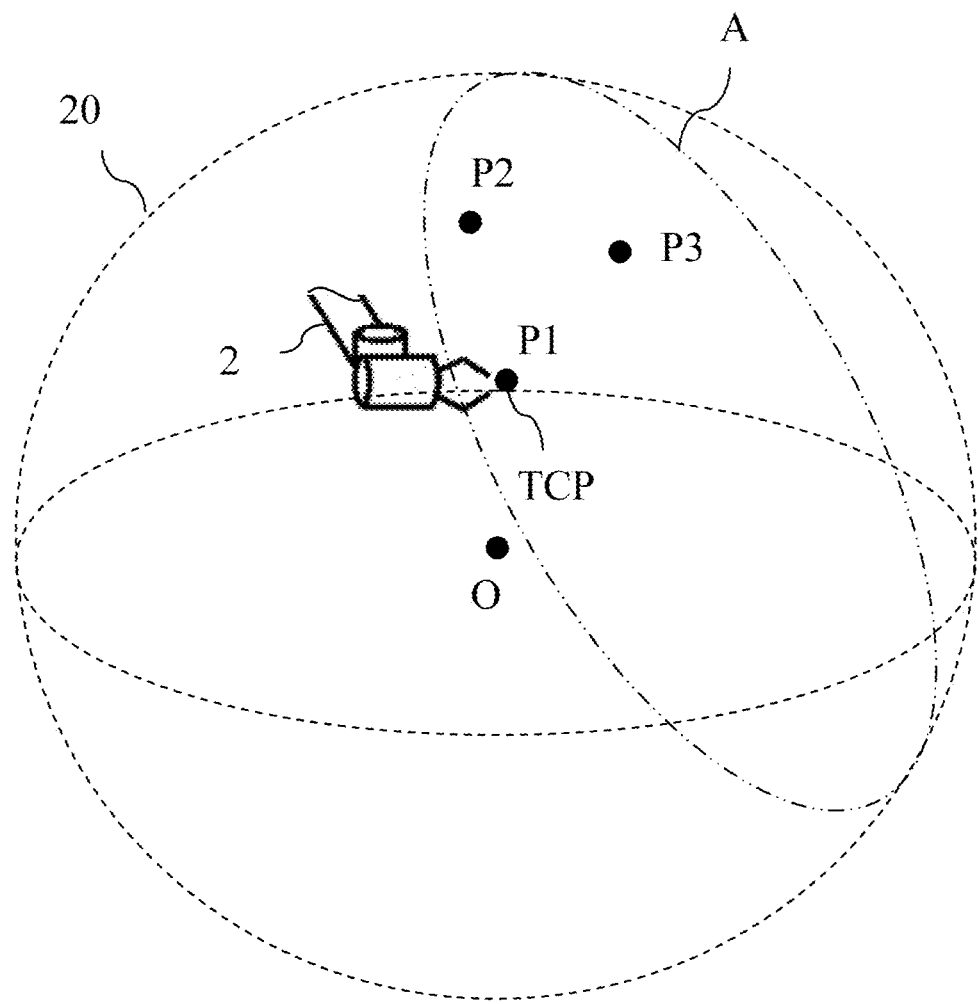
FIG. 3 is a diagram illustrating setting a partitioning plane according to the embodiment of the present application.

Please refer to FIG. 1, FIG. 2, and FIG. 3. FIG. 1 is a diagram of a control system 1 for controlling a robot 2 according to an embodiment of the present application. FIG. 2 is a diagram of a working space 20 of the robot 2 according to the embodiment of the present application. FIG. 3 is a diagram illustrating setting a partitioning plane A according to the embodiment of the present application. As shown in FIG. 1, the control system 1 includes the robot 2 which can have multi-axis motion, a controlling device 3, and a human machine interface 4. A fixed end of the robot 2 is configured as a base 5, and another movable end of the robot 2 is configured as a tool center point (TCP). The controlling device 3 is electrically connected to the robot 2 through a cable 6 for controlling the robot 2 to move the TCP thereof. The human machine interface 4 is electrically connected to the controlling device 3 by wireless connection and is configured with a displaying monitor 7 for displaying a robot image 8 and a construction interface 9 for setting the partitioning plane A. That is, a user can set the partitioning plane A by operating a confirmation button 10, choice buttons P1, P2, P3 and a cancel button 11 presented on the construction interface 9. Therefore, instructions input by the human machine interface 4 can be wirelessly transmitted to the controlling device 3 for being stored and for controlling the robot 2.

As shown in FIG. 2, an origin O of a coordinate system C can be set at the base 5 of the robot 2. The controlling device 3 can control the robot 2 to move the TCP, and every position where the TCP moves can be recorded as a position coordinate of the coordinate system C based on rotation angles of joints of the multi-axis robot 2. When the robot 2 with the TCP is straightened, a radius R of a maximum operational sphere of the robot 2 can be computed based on a distance between the origin O and the position coordinate of the TCP, and the maximum operational sphere can substantially be defined as the working space 20 of the robot 2. In practical application, a dimension of the straightened robot 2 with the TCP can be a default parameter provided by a supplier of the robot 2, and the radius R of the maximum operational sphere can be computed by adding a length of an applied tool at the TCP to the dimension of the straightened robot, which saves the need to actually straighten the robot 2 for measuring the dimension thereof.

After the definition of the working space 20 of the robot 2 is finished, the working space 20 can be partitioned into a plurality of working regions by setting the partitioning plane A. As shown in FIG. 3, the first step is to pull the TCP of the robot 2 to a first point P1 on the partitioning plane A to be set in the working space 20 before clicking the choice button P1 of the three choice buttons P1, P2, P3 presented on the construction interface 9 displayed by the human machine interface 4 as shown in FIG. 1. After the choice button P1 is clicked, the human machine interface 4 can display a first coordinate point 12 on the partitioning plane A presented on the construction interface 9 and regard the position coordinate of the TCP corresponding to the first coordinate point 12 as a position coordinate of the first point P1 so that the setting of the position coordinate of the first point P1 is confirmed and completed.

The second step is to pull the TCP of the robot 2 to a second point P2 on the partitioning plane A in the working space 20 before clicking the choice button P2 presented on the construction interface 9 displayed by the human interface 4. After the choice button P2 is clicked, the human machine interface 4 can display a second coordinate point 12' at a corresponding location on the partitioning plane A presented on the construction interface 9 and regard the position coordinate of the TCP corresponding to the second coordinate point 12' as a position coordinate of the second point P2 so that the setting of the position coordinate of the second point P2 is confirmed and completed.

Similarly, as shown in FIG. 3, the third step is to pull the TCP of the robot 2 to a third point P3 on the partitioning plane A in the working space 20 before clicking the choice button P3 on the construction interface 9 displayed by the human machine interface 4. After the choice button P3 is clicked, the human machine interface 4 can display a third coordinate point 12" at a corresponding location on the partitioning plane A presented on the construction interface 9 and regard the position coordinate of the TCP corresponding to the third coordinate point 12" as a position coordinate of the third point P3 so that the setting of the position coordinate o the third point P3 is confirmed and completed.

After the abovementioned setting steps are finished, the controlling device 3 can automatically render a plane to be confirmed which is based on the first point P1, the second point P2, and the third point P3 if the first point P1, the second point P2, and the third point P3 are non-collinear. To confirm setting of the rendered plane, an operator can click the confirmation button 10 so that the rendered plane can be utilized by the controlling device 3 to intersect the working space 20 of the robot 2 and can be substantially regarded as the partitioning plane A. The partitioning plane A can partition the working space 20 of the robot 2 into two working regions. If the rendered plane is unneeded, the operator can click the cancel button 11 to cancel the rendered plane together with the first point P1, the second point P2, and the third point P3 and restart the setting of the partitioning plane A. The coordinate points 12, 12', 12" are shown as black points in the embodiment, but the colors of the coordinate points 12, 12', 12" can be different and can be other than black, and the present application is not limited thereto.

Figure 4:
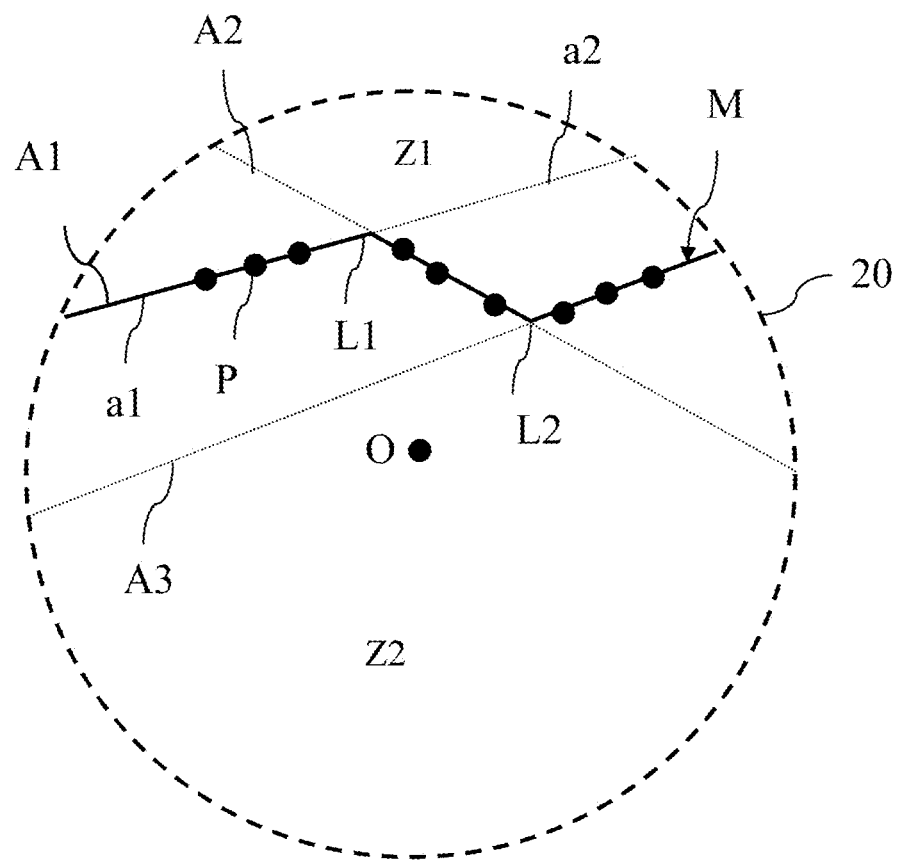
FIG. 4 is a diagram illustrating partitioning the working space according to the embodiment of the present application.
Figure 5:
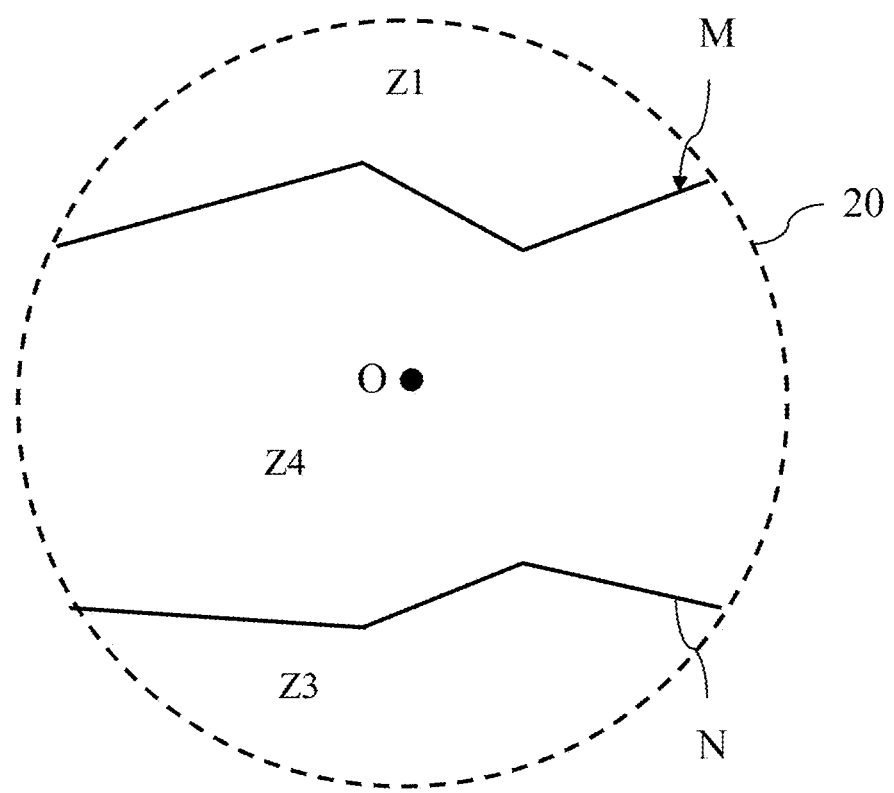
FIG. 5 is a diagram illustrating partitioning an operation region according to the embodiment of the present application.

Please refer to FIG. 4 and FIG. 5. FIG. 4 is a diagram illustrating partitioning the working space 20 according to the embodiment of the present application. FIG. 5 is a diagram illustrating partitioning an operation region Z2 according to the embodiment of the present application. Generally, the working space 20 can include a plurality of the abovementioned partitioning planes. In the embodiment illustrated in FIG. 4, the working space 20 includes three partitioning planes A1, A2, A3, but not limited to this. A Region in the working space 20 where accidents involving the robot, the operator, equipment, or final products might happen is set as a ceasing regions Z1 forbidding the robot 2 from entering thereinto. As shown in FIG. 4, for constructing the ceasing region Z1, Firstly, it is to set the three partitioning planes A1, A2, A3 based on at least three non-collinear points P via the abovementioned setting steps. Next, the controlling device 3 can intersect the three partitioning planes A1, A2, A3 to define partitioning lines L1, L2 and divide the three partitioning planes A1, A2, A3 into a plurality of sections based on the partitioning lines L1, L2. For example, the partitioning line L1 divides the partitioning plane A1 into a designated section a1 (as shown by the solid line in FIG. 4) and an extended section a2 (as shown by the dotted line in FIG. 4). Therefore, each of the partitioning planes A1, A2, A3 is divided into the designated section and the extended section. By preserving and combining the designated sections a1 of the partitioning planes A1, A2, A3 respectively, a full partitioning plane M (as shown by the solid line in FIG. 5) is constructed.

The full partitioning plane M partitions the working space 20 into two working regions as the ceasing region Z1 and the operation region Z2. That is, the present application automatically sets the working region containing the origin O of the robot 2 as the operation region Z2 and sets the other working region as the ceasing region Z1. The robot 2 is kept to work in the operation region Z2 and prevented from entering into the ceasing region Z1 during operation. Once the position coordinate of the TCP of the robot 2 is detected to shift into the ceasing region Z1 where the robot 2 is strictly forbidden to enter during operation, the robot 2 can be ceased urgently. In contrast to the ceasing region Z1, the operation region Z2 is a region where the robot 2 can move freely.

As shown in FIG. 5, the operation region Z2 can include a collaboration subregion Z3 where the robot 2 might need to collaborate with the operator. Through steps similar to the abovementioned steps in constructing the full partitioning plane M, the present application can set another full partitioning plane N along a designated boundary of the collaboration subregion Z3 and partitioning the operation region Z2 into the collaboration subregion Z3 and a full speed subregion Z4. Specifically, the present application automatically sets the subregion of the operation region containing the origin O of the robot 2 as the full speed subregion Z4 and sets the other subregion as the collaboration subregion Z3. Therefore, the robot 2 is kept to stay in the full speed subregion Z4 and prevented from entering the collaboration subregion Z3 during operation at a full speed or an optimum speed.

The robot 2 can operate at a full speed in the full speed subregion Z4 without interfering with an operator, which enhances the efficiency of the robot 2. Once the position coordinate of the TCP of the robot 2 is detected to shift into the collaboration subregion Z3 according to a collaboration demand, a moving speed of the robot 2 can be reduced to a level that causes no harm for ensuring safety of the operator.

Figure 6:
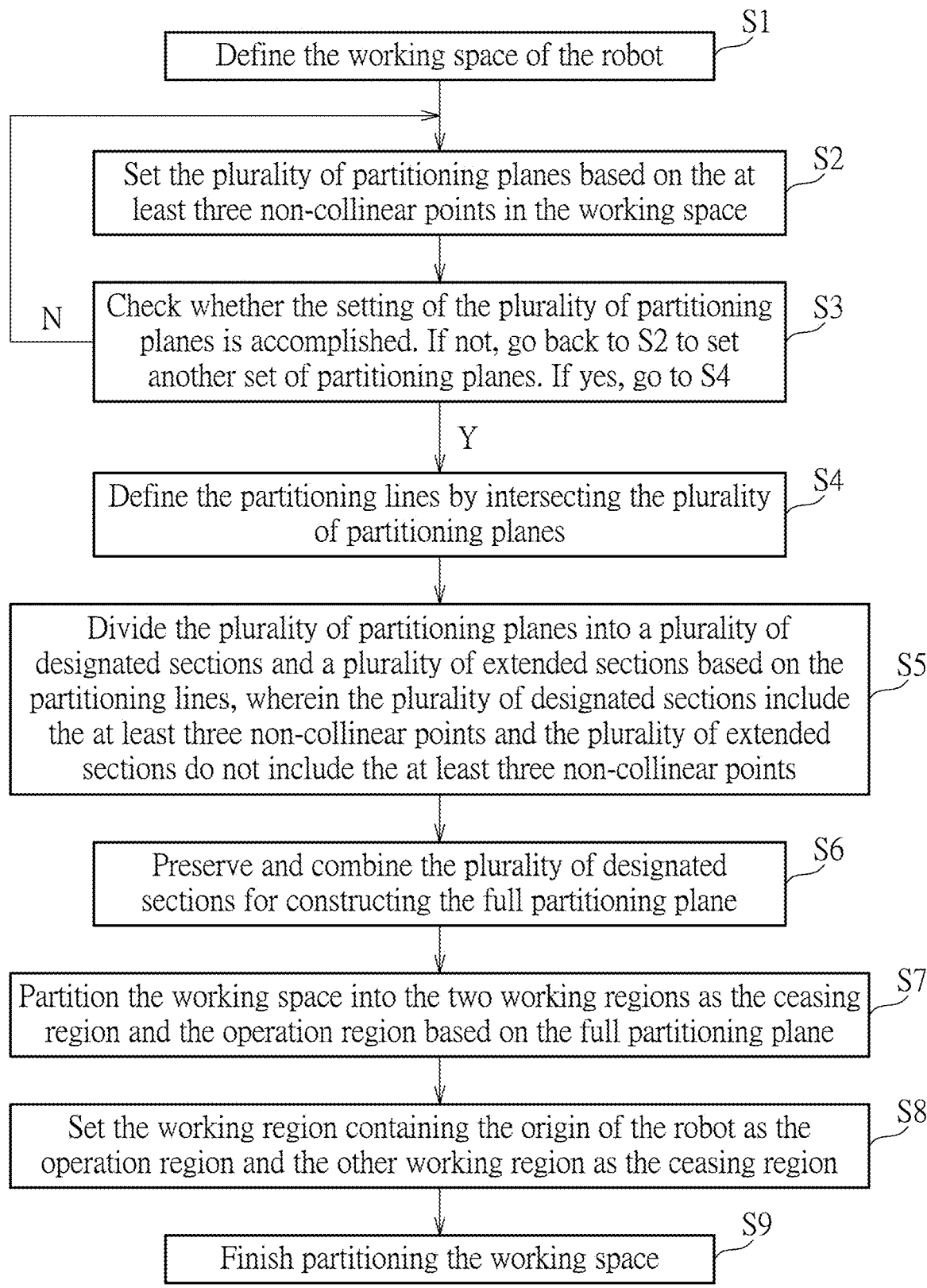
FIG. 6 is a flow diagram illustrating a partitioning method for the working space of the robot according to the embodiment of the present application.

Please refer to FIG. 6. FIG. 6 is a flow diagram illustrating a partitioning method for the working space of the robot 2 according to the embodiment of the present application. The detailed partitioning method for the working space of the robot 2 includes the following steps:

S1: Define the working space of the robot 2.

S2: Set the plurality of partitioning planes based on the at least three non-collinear points in the working space;

S3: Check whether the setting of the plurality of partitioning planes is accomplished. If not, go back to S2 to set another set of partitioning planes. If yes, go to S4.

S4: Define the partitioning lines by intersecting the plurality of partitioning planes.

S5: Divide the plurality of partitioning planes into a plurality of designated sections and a plurality of extended sections based on the partitioning lines, wherein the plurality of designated sections include the at least three non-collinear points and the plurality of extended sections do not include the at least three non-collinear points.

S6: Preserve and combine the plurality of designated sections for constructing the full partitioning plane.

S7: Partition the working space into the two working regions as the ceasing region and the operation region based on the full partitioning plane.

S8: Set the working region containing the origin of the robot 2 as the operation region and the other working region as the ceasing region.

S9: Finish partitioning the working space.

The partitioning method for the working space of the robot of the present application can set the plurality of partitioning planes based on the at least three non-collinear points in the working space, generate the plurality of designated sections and the plurality of extended sections via intersection of the plurality of partitioning planes, and preserve and combine the plurality of designated sections for constructing the full partitioning plane, which simplifies the partitioning process. In addition, the partitioning method of the present application can partition the working space into two working regions based on the full partitioning plane, wherein the working region containing the robot is set as the operation region and the other working region is set as the ceasing region, which improves efficiency of the partitioning process. Besides, if the operation region is required to be further partitioned, the present application can construct another full partitioning plane to partition the operation region into the full speed subregion containing the robot and the collaboration subregion. Therefore, the robot can move at a full speed or an optimum speed in the full speed subregion, which improves efficiency of robot operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A partitioning method for a working space of a robot, comprising:

utilizing a human machine interface to define the working space of the robot;

utilizing the human machine interface to set a plurality of partitioning planes for partitioning the working space via at least three non-collinear points set by positioning a tool center point (TCP) of the robot at the at least three non-collinear points;

a controlling device defining a partitioning line by intersecting the plurality of partitioning planes after checking that the setting of the plurality of partitioning planes is completed;

the controlling device dividing the plurality of partitioning planes into a plurality of designated sections and a plurality of extended sections based on the partitioning line;

the controlling device combining the plurality of designated sections for constructing a full partitioning plane;

the controlling device partitioning the working space into a plurality of working regions based on the full partitioning plane; wherein the plurality of working regions comprise a ceasing region and an operation region;

setting a working region of the plurality of working regions containing an origin of the robot as the operation region, and setting another full partitioning plane for partitioning the operation region into a collaboration subregion and a full speed subregion; and reducing a moving speed of the robot to a level that causes no harm when the robot is detected to enter into the collaboration subregion.

2. The partitioning method of claim 1, wherein setting the plurality of partitioning planes comprises setting another partitioning plane after checking that the setting of the plurality of partitioning planes is not completed.

3. The partitioning method of claim 1, wherein the plurality of designated sections comprise the at least three non-collinear points.

4. The partitioning method of claim 3, wherein the plurality of extended sections does not comprise the at least three non-collinear points.

5. The partitioning method of claim 1, further comprising forbidding the robot from entering into the ceasing region, and ceasing the robot urgently when the robot is detected to enter into the ceasing region.

6. The partitioning method of claim 1, further comprising setting a part of the operation region containing the origin of the robot as the full speed subregion.

7. The partitioning method of claim 1, further comprising operating the robot at a full speed without interfering with an operator within the full speed subregion.

8. The partitioning method of claim 1, wherein utilizing the human machine interface to define the working space of the robot comprises utilizing the human machine interface to define the working space of the robot according to a size of the robot, a size of a tool operated by the robot, and a position where a base of the robot is configured.

* * * * *